3,314,934
BASIC THIAZOLE-AZO DYES

Dieter Leuchs, Ludwigshafen (Rhine), Germany, assignor to Badische Anilin- & Soda-Fabrik Aktiengesellschaft, Ludwigshafen (Rhine), Germany
No Drawing. Filed Dec. 30, 1963, Ser. No. 334,599
Claims priority, application Germany, Jan. 3, 1963, B 70,207
6 Claims. (Cl. 260—158)

This invention relates to basic azo dyes of the 1,3-thiazole-azo series which bear an acyl group, carboxy group, carbalkoxy group or carbonamide group in the 5-position of the thiazole radical and an alkyl radical or aryl radical in 4-position.

Thiazole-azo dyes have already been described whose thiazole radical is unsubstituted or bears an alkyl group in 5-position. These dyes give dyeings on polyacrylonitrile, some of which have excellent fastness. They have the disadvantage, however, that only a limited range of shades can be prepared.

It is an object of this invention to produce a bathochromic shift of the shade of color by suitable substitution of the thiazole radical, in order for example when using a dimethylaniline coupling component to obtain a pure blue shade of color which in general can only be obtained with anthraquinone dyes. Since these anthraquinone dyes are however considerably more expensive than azo dyes and moreover are considerably weaker in color strength than basic azo dyes, it is desirable to prepare basic azo dyes.

This object is achieved by substituting the thiazole radical in 5-position by an acyl group, carboxyl group, carbalkoxy group or carbonamido group, an unexpectedly substantial bathochromic shift of the shade of color taking place. This shift of the absorption toward longer waves is surprising because in the case of equivalent basic benzothiazole-azo dyes, substitution in 6-position (which corresponds in its conjugation to the 5-position of thiazole) with electron attractive substituents, for example a nitro group, even leads to a hypsochromic shift of the shade of color.

Basic thiazole-azo dyes have also already been described which bear an acetyl group or a carbethoxy group in the 4-position of the thiazole radical. The shade of color of these dyes is, however, not shifted bathochromically with respect to the dyes which are not substituted in the thiazole radical. The dyes of the present invention also are superior to the said prior art dyes by better light fastness.

The invention relates in particular to dyes having cations of the formula:

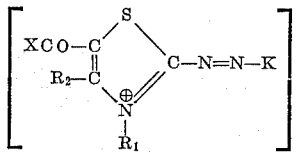

in which K denotes the radical of an amino compound capable of coupling or the radical of an enamine capable of coupling, X denotes an alkyl radical, an aryl radical, a hydroxyl group, an alkoxy group, an alkylamino radical or an arylamino radical, $R_1$ denotes an aliphatic radical and $R_2$ denotes an alkyl radical or aryl radical.

Of these dyes, those are particularly valuable industrially in which K denotes the radical of N-dimethyl-aniline, N-dimethyl-m-toluidine, N - methyl - N - hydroxyethyl-m-toluidine, N-methyl-N-cyanoethyl-aniline, N-dimethyl - m - chloroaniline, 2 - phenylindole, 1 - methyl-2-phenylindole, 1,3,3 - trimethyl - 2 - cyanomethylene - indolenine, 1,3,3 - trimethyl-2-methyleneindolenine or 1,3-dimethyl-2-cyanomethylenebenzimidazolidine, X denotes a methyl group, ethoxy group, hydroxyl group, phenyl group, phenylamino group, 4-chlorophenylamino group, 2,4-dimethoxyphenylamino group or butylamino group, $R_2$ denotes methyl or phenyl and $R_1$ denotes methyl or ethyl.

The anions of the dyes may be any organic or inorganic colorless anions which have been introduced by alkylation or subsequently. The following are examples:

$Cl^\ominus$   $ZnCl_4^{\ominus\ominus}$
$Br^\ominus$   $CH_3OSO_3^\ominus$
$I^\ominus$   $C_2H_5OSO_3^\ominus$
$HSO_4^\ominus$   $ZnBr_4^{\ominus\ominus}$
$SO_4^{\ominus\ominus}$ and

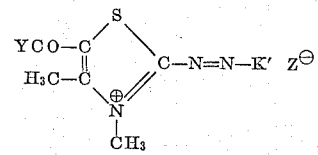

Of the said dyes, those have particularly outstanding tinctorial properties which have the general formula:

in which Y denotes a methyl group, hydroxyl group or ethoxy group, K' denotes the radical of dimethylaniline or 1-methyl-2-phenylindole and $Z^\ominus$ denotes a colorless anion.

The dyes of the invention are obtained when azo dyes having the general formula:

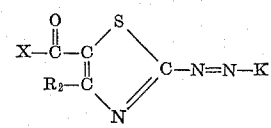

in which K, $R_2$ and X have the meanings given above are alkylated by a conventional method.

The azo dyes to be alkylated may be prepared in a conventional way, for example by diazotization and coupling. The following are examples of diazo components which may be used for the preparation of the dyes:

2-amino-4-methyl-5-acetylthiazole,
2-amino-4-phenyl-5-benzoylthiazole,
2-amino-4-phenyl-5-benzoylthiazole,
2-amino-4-methylthiazole-5-carboxylic acid,
2-amino-4-methylthiazole-5-carboxylic ethyl ester,
2-amino-4-phenylthiazole-5-carboxylic ethyl ester,
2-amino-4-methylthiazole-5-carboxylic butylamide,
2-amino-4-methylthiazole-5-carboxylic anilide,
2-amino-4-methylthiazole-5-carboxylic p-toluidide,
2-amino-4-methylthiazole-5-carboxylic p-chloroanilide, 2-amino-4-methylthiazole-5-carboxylic acid p-phenetidide,
2-amino-4-methylthiazole-5-carboxylic (2,4-dimethoxy-anilide), and
2-amino-4-methylthiazole-5-carboxylic α-naphthylamide.

Where the said aminothiazoles are compounds not hitherto known, they may be prepared by conventional methods, for example by halogenation of the corresponding 1,3-dicarbonyl compounds and reaction of the resultant 2-halo-1,3-dicarbonyl compounds with thiourea. Examples of suitable coupling components are N,N-disubstituted aminobenzenes, such as dimethylaniline, dimethyl-m-toluidine, diethylaniline, hydroxyethylmethylaniline, cyanoethylmethylaniline, cyanoethylacetoxyethylaniline, dimethyl-m-anisidine or dimethyl-m-chloroaniline, and also 1-ethylaminonaphthalene, or nitrogenous five-membered heterocycles capable of coupling, such as 2-methylindole, 1,2-dimethylindole, 2-phenylindole, 1-methyl-2-phenylindole, 2-methylene-1,3,3-trimethyldihydroindole, 2-cyanomethylene-1,3,3-trimethyldihydroindole, N - methylcarbazole, 2-cyanomethylbenzimidazole and also 1-isobutyl-3-hydroxy-7-methyl-1,2,3,4-tetrahydro-quinoline.

Alkylation of the azo dyes to be used according to the invention may be carried out for example without solvents or in the presence of solvents, such as benzene, chlorobenzene, toluene, xylene, dichlorobenzene, dimethyl formamide, N-methylprrolidone, chloroform, tetrachloroethane, trichloroethylene, tetrachloroethylene, or acetonitrile at temperatures between 20° and 150° C., if necessary with the addition of acid-binding agents, such as magnesium oxide, magnesium carbonate, calcium carbonate, or sodium bicarbonate. The alkylating agent is used in the stoichiometric amount or in excess. One or more alkyl groups are introduced into the dye molecule depending on the number of alkylatable nitrogen atoms in the initial dye.

I understand alkylation to include not only the introduction of alkyl radicals but also of substituted alkyl radicals, such as chloroethyl radicals or benzyl radicals.

Accordingly the following are examples of suitable alkylating agents: diethyl sulfate, the methyl, ethyl and chloroethyl esters of benzenesulfonic acid and toluenesulfonic acid, β-bromopropionitrile, methyl iodide, ethyl bromide, triethyloxinium borofluoride, benzyl chloride and particularly dimethyl sulfate.

The dyes of the invention are suitable for example for dyeing various materials, such as silk, leather, skins, hair, mordanted cotton, synthetic polyamides, cellulose esters and also for coloring spinning solutions and lacquers. Very fast dyeings and prints are obtained in particular on polymers and copolymers of acrylonitrile and dicyanoethylene.

The parts specified in the following examples are parts by weight. Parts by volume bear the same relation to parts by weight as the liter (S.T.P.) to the kilogram. The examples illustrate but do not limit the invention.

*Example 1*

374 parts of the azo dye having the formula

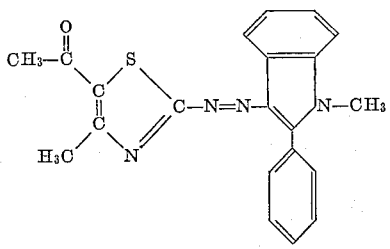

are stirred in 3500 parts by volume of chloroform and at 55° C. 189 parts of dimethyl sulfate are added in the course of two hours. The reaction mixture is boiled for six to eight hours under reflux until the initial dye can no longer be detected by paper chromatography. The chloroform is then distilled off with the simultaneous gradual addition of 3500 parts by volume of water. The aqueous dye suspension thus obtained is acidified while still hot with 100 parts by volume of 10 N hydrochloric acid and the dye is precipitated with 1000 parts of saturated common salt solution. After suction filtration and drying, 450 parts of the dye having the formula

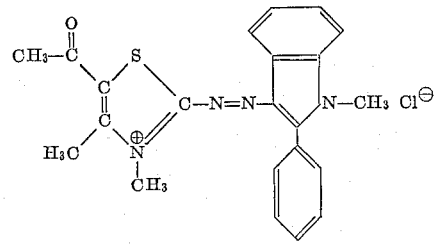

are obtained which dyes polyacrylonitrile fibers fast bluish red shades.

If the initial dye used in paragraph 1 of this example be replaced by 318 parts of the coupling product of 2-amino-4-methylthiazole-5-carboxylic ethyl ester and dimethylaniline, 370 parts of the dye having the formula

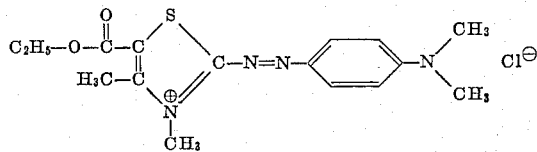

is obtained which gives very fast blue dyeings on polyacrylonitrile.

By using the same amount of chlorobenzene instead of chloroform, the dye crystallizes out from the reaction mixture as the methylsulfuric acid salt. Similar dyes are obtained in an equivalent way from the initial components set out in the following table:

| Example No. | Initial dye | Alkylating agent | Shade of dyeing on polyacrylonitrile |
| --- | --- | --- | --- |
| 2 | [structure] | Dimethyl sulfate | Reddish blue. |
| 3 | [structure] | ____do____ | Greenish blue. |

| Example No. | Initial dye | Alkylating agent | Shade of dyeing on polyacrylonitrile |
|---|---|---|---|
| 4 | C₂H₅O-CO-[thiazole-CH₃]-N=N-[indole-NH, 2-phenyl] | Dimethyl sulfate | Claret. |
| 5 | HOOC-[thiazole-CH₃]-N=N-C₆H₄-N(CH₃)₂ | Methyl toluene sulfonate | Blue. |
| 6 | Cl-C₆H₄-NH-CO-[thiazole-CH₃]-N=N-[2-methylphenyl]-N(CH₃)(C₂H₄OH) | Dimethyl sulfate | Do. |
| 7 | H₃CO-, OCH₃-C₆H₃-NH-CO-[thiazole-CH₃]-N=N-[2-methylphenyl]-N(CH₃)₂ | ----do---- | Greenish blue. |
| 8 | C₆H₅-NH-CO-[thiazole-CH₃]-N=N-C(CN)=[3,3-dimethyl-1-methylindoline] | ----do---- | Red. |
| 9 | CH₃-CO-[thiazole-CH₃]-N=N-C₆H₄-N(CH₃)(C₂H₄CN) | ----do---- | Blue. |
| 10 | C₆H₅-CO-[thiazole-phenyl]-N=N-C₆H₄-N(CH₃)₂ | ----do---- | Greenish blue. |
| 11 | C₄H₉NH-CO-[thiazole-CH₃]-N=N-[indole-NCH₃, 2-phenyl] | ----do---- | Red. |
| 12 | CH₃-CO-[thiazole-CH₃]-N=N-[3-chlorophenyl]-N(CH₃)₂ | Ethyl bromide | Blue. |
| 13 | C₂H₅O-CO-[thiazole-CH₃]-N=N-[indole-NH, 2-methyl] | Methyl benzene sulfonate | Red. |

| Example No. | Initial dye | Alkylating agent | Shade of dyeing on polyacrylonitrile |
|---|---|---|---|
| 14 | [structure: ethyl 4-methylthiazole-5-carboxylate coupled via N=N to 2-phenylindole NH] | Dimethyl sulfate | Claret. |
| 15 | [structure: ethyl 4-methylthiazole-5-carboxylate coupled via N=N to 1-methyl-2-phenylindole] | do | Do. |
| 16 | [structure: 4-methylthiazole-5-carboxylic acid coupled via N=N to 1-methyl-2-phenylindole] | do | Do. |
| 17 | [structure: 5-acetyl-4-methylthiazole coupled via N=N to 4-dimethylaminophenyl] | do | Blue. |

The sulfates or zinc chloride or bromide double salts of the dyes 1 to 7 may be prepared in the same way as the methosulfate or chloride.

*Example 18*

354 parts of the dye 2-amino-4-methylthiazole-5-carboxylic ethyl ester→2-cyanomethylbenzimidazole are stirred in 4000 parts by volume of chloroform. 81 parts of magnesium oxide are added, 400 parts of dimethyl sulfate are allowed to flow in at 50° C. and the mixture is boiled for eight hours. The chloroform is then distilled off while at the same time adding 5000 parts of water. The aqueous dye solution is acidified with hydrochloric acid and the dye salted out with common salt. 400 parts of the dye having the formula

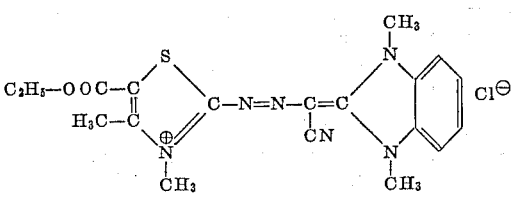

are obtained with which strong reddish yellow dyeings are obtained on polyacrylonitrile.

Similar dyes may be prepared from the initial components set out in the following table by the methods described in the examples.

| Example | Initial dye | Alkylating agent | Shade of dyeing on polyacrylonitrile |
|---|---|---|---|
| 19 | | 3 moles of dimethyl sulfate + 2 moles of magnesium oxide. | Orange. |
| 20 | | ...do... | Do. |
| 21 | | 2 moles of dimethyl sulfate + 1 mol of magnesium oxide. | Red. |

I claim:

1. A dye of the formula

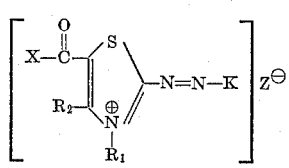

wherein

K represents a radical selected from the class consisting of N-dimethylaniline, N-dimethyl-m-toluidine, N-methyl-N-hydroxyethyl-m-toluidine, N-methyl-N-cyanoethylaniline, N-dimethyl-m-chloroaniline, 2-phenylidole, 1-methyl-2-phenylindole, 1,3,3-trimethyl-2-cyanomethylene-indolenine, 1,3,3-trimethyl-2-methylene-indolenine, 1,3-dimethyl-2-cyanomethylene-benzimidazolidine and 1,3-dimethyl-2-carbamoylmethyl-methylene-benzimidazoline X represents a radical selected from the class consisting of methyl, phenyl, ethoxy, hydroxy, phenylamino, 4-chlorophenylamino, 2,4-dimethoxyphenylamino and butylamino, $R_1$ represents a radical selected from the class consisting of methyl and ethyl, $R_2$ represents a radical selected from the class consisting of methyl and phenyl, and Z represents a colorless anion.

2. The dye of the formula

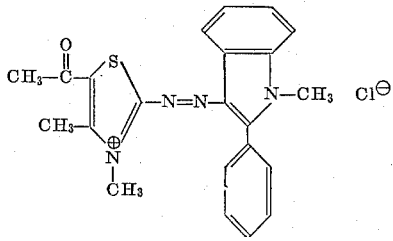

3. The dye of the formula

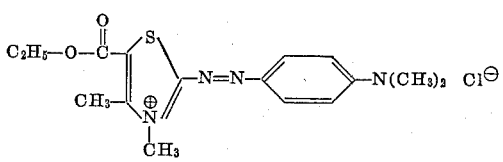

4. The dye of the formula

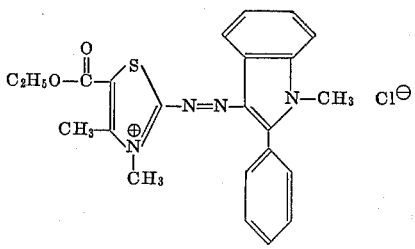

5. The dye of the formula

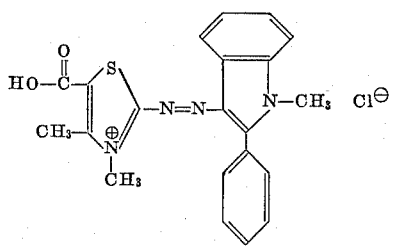

6. The dye of the formula

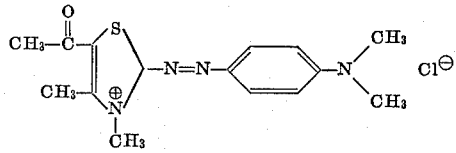

(References on following page)

References Cited by the Examiner

UNITED STATES PATENTS 2,889,315 6/1959 Bossard et al. _____ 260—158 X
3,101,988 8/1963 Bossard et al. _____ 260—158 X

FOREIGN PATENTS 244,499 3/1960 Switzerland.

CHARLES R. PARKER, *Primary Examiner.*
FLOYD D. HIGEL, *Assistant Examiner.*